US011190478B1

(12) United States Patent
Grandhi

(10) Patent No.: US 11,190,478 B1
(45) Date of Patent: Nov. 30, 2021

(54) ENHANCED USER INTERFACES AND ASSOCIATED PROCESSES IN EMAIL COMMUNICATION

(71) Applicant: Sudheer A. Grandhi, Pleasanton, CA (US)

(72) Inventor: Sudheer A. Grandhi, Pleasanton, CA (US)

(73) Assignee: Sudheer A. Grandhi, Pleasanton, CA (US)

( * ) Notice: Subject to any disclaimer, the term of this patent is extended or adjusted under 35 U.S.C. 154(b) by 77 days.

(21) Appl. No.: 16/541,718

(22) Filed: Aug. 15, 2019

Related U.S. Application Data

(63) Continuation of application No. 14/180,042, filed on Feb. 13, 2014, now Pat. No. 10,389,675.

(60) Provisional application No. 61/766,129, filed on Feb. 19, 2013, provisional application No. 61/773,149, filed on Mar. 6, 2013.

(51) Int. Cl.
*G06F 3/0488* (2013.01)
*G06F 3/0484* (2013.01)
*H04L 12/58* (2006.01)
*G06F 3/0487* (2013.01)
*G06F 3/0481* (2013.01)
*G06F 3/048* (2013.01)

(52) U.S. Cl.
CPC ............ *H04L 51/30* (2013.01); *G06F 3/048* (2013.01); *G06F 3/0481* (2013.01); *G06F 3/0484* (2013.01); *G06F 3/0487* (2013.01); *G06F 3/0488* (2013.01); *G06F 3/04883* (2013.01); *G06F 3/04886* (2013.01)

(58) Field of Classification Search
CPC ......... H04L 51/30; H04L 51/36; G06F 3/048; G06F 3/0481; G06F 3/0484; G06F 3/0487; G06F 3/0488; G06F 3/04883; G06F 3/04886; G06Q 10/107
See application file for complete search history.

(56) References Cited

U.S. PATENT DOCUMENTS 5,872,925 A 2/1999 Han
5,878,230 A 3/1999 Weber et al.
(Continued)

OTHER PUBLICATIONS

Sperry Software, Inc., "Outlook Email Tools: Save Time and Money while Reducing Risk," Nov. 2007, Sperry Software, Inc., 833 Pheasant Ct., Jacksonville, FL (15 pp.).

*Primary Examiner* — Daniel Samwel
(74) *Attorney, Agent, or Firm* — Silicon Edge Law Group LLP; Arthur J. Behiel

(57) ABSTRACT

Methods and systems are disclosed for user interfaces and associated processes in email communication. Incoming email messages that identify a sender and message recipients are rendered with Reply, Reply-All, and Forward command icons that can be activated by a user to create an outgoing email message. When a user so activates one of the command icons, the methods and systems create and render the outgoing email message to include a Send icon that indicates the command activated to create the outgoing email message (e.g., the Send icon alerts the user that the outgoing email message was created responsive to a Reply-All command). The Send icon may also inform the user of input required to activate the Send command (e.g., double click) based on the command that initiated creation of the outgoing email message.

18 Claims, 11 Drawing Sheets

(56) References Cited

U.S. PATENT DOCUMENTS

| | | |
|---|---|---|
| 7,720,919 B2 | 5/2010 | Khouri et al. |
| 7,792,911 B2 | 9/2010 | Wilson |
| 7,877,448 B2 | 1/2011 | Janakiraman et al. |
| 8,010,599 B2 | 8/2011 | Chang et al. |
| 8,055,718 B2 | 11/2011 | Slaybers |
| 8,116,790 B2 | 2/2012 | Kim |
| 8,150,385 B1 | 4/2012 | Majeti et al. |
| 8,346,859 B2 | 1/2013 | Chang et al. |
| 8,549,412 B2 | 10/2013 | Brezina et al. |
| 8,886,734 B2 | 11/2014 | Forstall et al. |
| 2003/0233410 A1 | 12/2003 | Gusler et al. |
| 2004/0073616 A1 | 4/2004 | Fellenstein et al. |
| 2004/0078488 A1* | 4/2004 | Patrick ................. G06Q 10/107 709/245 |
| 2005/0102363 A1* | 5/2005 | Yokomura ............... H04L 51/14 709/206 |
| 2005/0132066 A1* | 6/2005 | Heilmann ............ G06Q 10/107 709/228 |
| 2005/0223063 A1 | 10/2005 | Chang et al. |
| 2006/0143575 A1* | 6/2006 | Sauermann ............. G06F 3/038 715/808 |
| 2008/0122796 A1 | 5/2008 | Jobs et al. |
| 2008/0183823 A1* | 7/2008 | Valencia ............... G06Q 10/107 709/206 |
| 2008/0306972 A1 | 12/2008 | Wilkin et al. |
| 2009/0210504 A1* | 8/2009 | Shuster .................. H04L 51/30 709/206 |
| 2010/0042684 A1 | 2/2010 | Broms et al. |
| 2010/0293475 A1 | 11/2010 | Nottingham et al. |
| 2011/0055334 A1* | 3/2011 | Tivyan .................... H04L 51/30 709/206 |
| 2011/0126126 A1 | 5/2011 | Blair |
| 2011/0145336 A1* | 6/2011 | Carroll ................... H04L 51/28 709/206 |
| 2011/0320974 A1* | 12/2011 | Bai ........................ G06F 3/016 715/773 |
| 2013/0080964 A1 | 3/2013 | Shigeta |

\* cited by examiner

ENHANCED USER INTERFACES AND ASSOCIATED PROCESSES IN EMAIL COMMUNICATION

FIELD OF INVENTION

The disclosed embodiments relate to user interfaces and associated processes in email communication.

BACKGROUND

As computer-based communication devices including portable devices proliferate email applications continue to be supported as an important means of communication in these devices. This is due in most part to the usefulness of email communication when the same message is to be sent to multiple recipients. As devices become more compact with smaller display screens design of user interfaces that allow efficient user interactions has become increasingly important. This is particularly so in portable communication devices such as mobile telephones, smart phones and tablet computers.

Conventional user interfaces in email communication suffer from drawbacks and deficiencies that increase the risk of unintended user actions associated with the use of the Reply All command in email communications. The unintended user actions in using the Reply All command may lead to user remorse and regret. Sometimes the privacy and confidentiality expected in an email message containing sensitive or confidential information may be compromised due to the email message being received by unintended recipients. Moreover these problems become more pronounced in portable communication devices with small display screens. Consequently there is a need for user interfaces and associated processes to reduce the risk of unintended user actions associated with the use of the Reply All command in email communication.

SUMMARY

This summary is provided to serve as a simple introduction to the present invention that is further described in the detailed description. It is not the intention in this summary to capture all the essential features and elements of the invention. The present invention provides a method and system for user interfaces and associated processes in email applications. Embodiments are disclosed to reduce the risk of unintended user actions associated with the use of the Reply All command. In many of the disclosed embodiments context information pertaining to email messages is used to reduce the drawbacks and deficiencies of user interfaces in email applications. In some of the disclosed embodiments efficient ways to implement user interfaces and email commands are provided. The features and elements of the invention may be understood from reading the detailed description.

The disclosed embodiments in the present invention for user interfaces and associated processes in email communication may be implemented on computer hardware and software platforms that may include one or more user interface systems and other peripheral units.

BRIEF DESCRIPTION OF THE DRAWINGS

A better understanding of the embodiments of the present invention may be obtained from the detailed description below, given by way of example in conjunction with the following drawings.

It will be appreciated that for simplicity and purposes of illustration elements in the figures are not necessarily drawn to scale. Furthermore, reference numbers may be repeated across figures to signify corresponding elements or features.

DETAILED DESCRIPTION

A number of specific details are presented in the detailed description that follows to provide a thorough understanding of the present invention. However others skilled in the art will appreciate that the present invention may be practiced without these specific details. Details of well-known methods and systems have not been included in the description so as not to obscure the description of the embodiments of the present invention.

Figure 1:
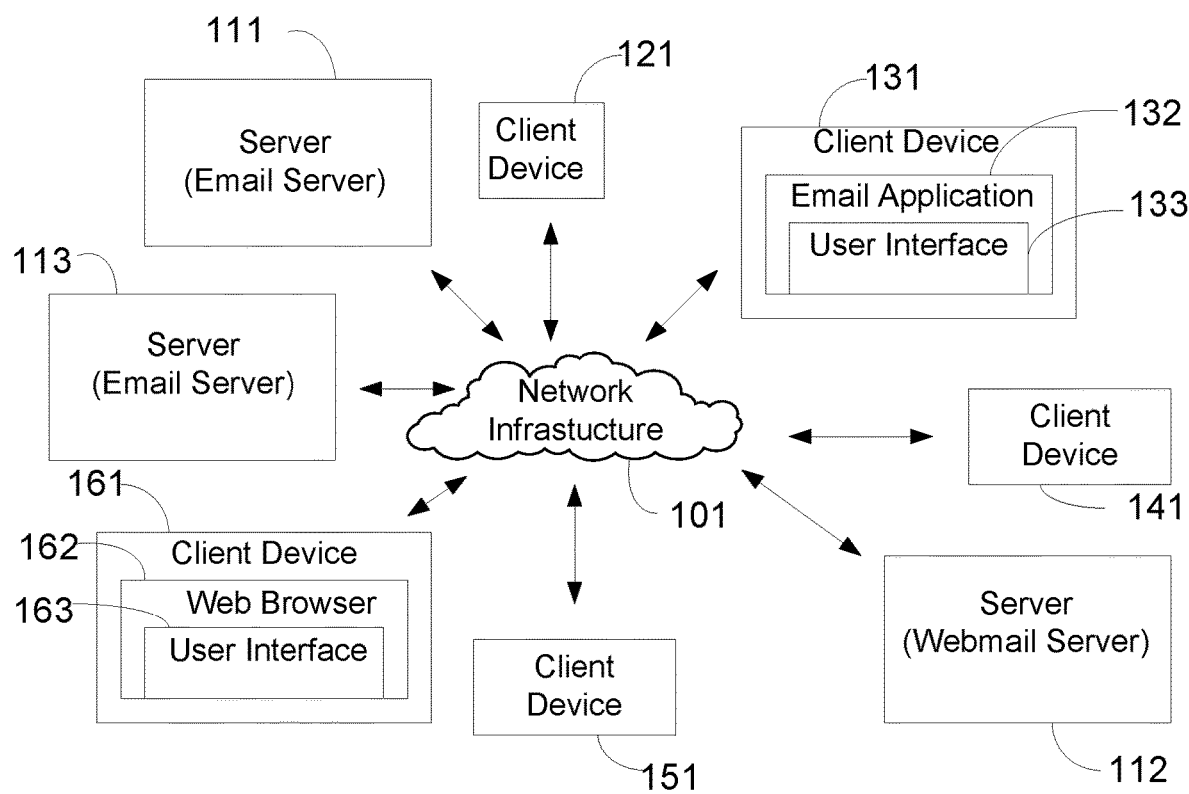
FIG. 1 is a system diagram of an example networked system in which one or more disclosed embodiments may be implemented.

FIG. 1 is a system diagram of an example networked system in which the disclosed embodiments may be implemented. A method for email user interfaces and associated processes to reduce the risk of unintended user actions may be implemented in email applications executed on a client device, a server or on servers and client devices communicating over a network infrastructure 101. The network infrastructure 101 may include wired and/or wireless networks. These networks may have security or may not have security. Client devices 121, 131, 141, 151, 161 may be mobile telephones, smartphones, television sets, tablet computers, computer laptops, computer desktops and the like which may be connected to the network on a wired or wireless communication link. Servers 111, 113 may be configured as email servers. A server 112 may be configured as a webmail server. In some scenarios an email application 132 providing a user interface 133 in accordance with the present invention may be implemented in an individual client device 131. An email application on a client device 131 is referred to sometimes as an email client application for which a server 111 may provide an email application referred to as an email server application. Client devices 121, 131, 141, 151, 161 may run their own email client applications and communicate over the network infrastructure 101. In other scenarios such as a webmail scenario an email application providing a user interface 163 in accordance with the present invention may be executed on a server 112 (configured as a webmail server) and accessed from a client device 161 for instance via a web browser 162. An email application executed on server 112 (configured as a webmail server) may be referred to as a webmail application. FIG. 1 is for illustration purpose only and well known technology components are not described in detail so as not to obscure the description of the embodiments. Furthermore many other configurations of devices, servers and nodes on the network may be used to implement email applications providing user interfaces in accordance with the present invention.

Figure 2:
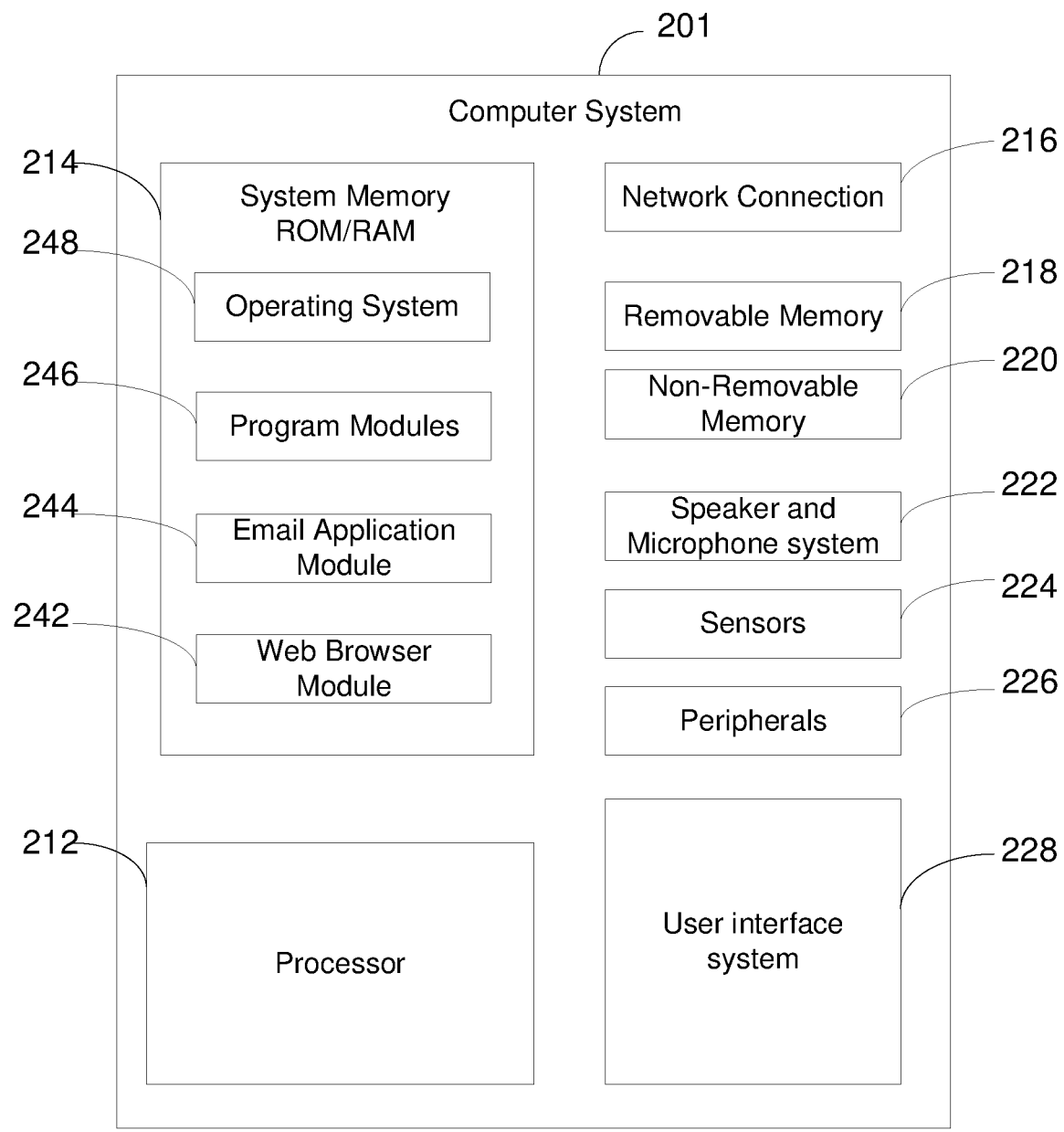
FIG. 2 is a block diagram of an example computer system in which one or more of the embodiments of the present invention may be implemented.

FIG. 2 is a block diagram of an example computer system 201 in which the embodiments of the present invention may be implemented. The computer system 201 may include a processor 212, a system memory 214, a network connection 216, a removable memory 218, a non-removable memory 220, a speaker and microphone system 222, sensors 224, peripherals 226, a user interface system 228. The computer system 201 is provided just as an example without going into descriptive details of well-known technology components of computer systems capable of various functions. It will be appreciated by those skilled in the art that the computer system 201 may include any subset of the mentioned components or other components not mentioned. The computer system 201 in FIG. 2 may be a client device or a server depending on the component configuration.

The processor 212 may be any computer processor that is currently known or developed later. The system memory 214 may be non-volatile memory such as ROM, volatile memory such as RAM or a combination of non-volatile and volatile memory. The system memory 214 includes an operating system 248, an email application module 244, a web browser module 242 and other program modules 246. The operating system 248 manages and controls various system tasks such as memory management and power management. Program modules 246 in the system memory may be application software components such as a GPS module, a Camera module, a Telephone module and the like. The email application module 244 enables email communication and provides a user interface in accordance with the present invention. Typically, the email application module 244 may be used to create, send, receive and manage email messages. The web browser module 242 may typically be used to browse the World Wide Web, access web pages and receive content from servers. Furthermore the web browser module 242 may enable a user to access an email application executed on a webmail server with the user interface of the email application provided to the user within the web browser.

The network connection 216 may be wired or wireless. As an example, the removable memory 218 may be a memory stick and the non-removable memory 220 may be a hard disk. The speaker and microphone system 222 is typically included in a computer system such as a smartphone or computer laptop and provides an audio interface. Sensors 224 may be proximity sensors or optical sensors which are typically included in a computer system such as a smartphone. Examples for peripherals 226 are digital cameras, universal serial bus (USB) port and the like.

The user interface system 228 enables interaction with the user for the user interface provided by an email application in accordance with the present invention. The user interface system 228 supports a user interface comprising an input interface and an output interface between the computer system 201 (configured as a client device) and a user. The input interface detects or senses input from the user and the output interface renders or displays output to the user. The user interface system 228 may detect or sense any user input in any form including but not limited to voice, touch, gesture, multi-touch, pressure, movement, motion, proximity, input with computer interface devices (e.g. computer mouse, touch pad, stylus) and the like. Furthermore the user interface system 228 may employ detection technologies currently known (such as touch sensitive screen) or developed later. The user interface system 228 may provide or render output to the user in any form including but not limited to visual, audio and haptic modes. For example visual output may include graphics currently known or developed later. The term graphics as used in the description of the present invention includes any visual element or characteristic that may be displayed to the user including but not limited to text, color, texture, intensity, shape, icons, images, animation and video. Furthermore the user interface system 228 may employ display or rendering technologies currently known (such as touch screen) or developed later.

A user action indicating proximity and/or interest in a displayed element or object on the user interface will be referred to in the description of the present invention as "hovering over" the displayed element or object. An example of such a user action is passing or moving a cursor over an icon with a computer mouse and this user action is referred to as "hovering over" the icon (which is different from selecting or activating the icon by clicking on it with a computer mouse).

FIG. 2 is for illustration purpose only and well known technology components are not described in detail so as not to obscure the description of the embodiments. Furthermore many other configurations of computer components and peripherals may be used to implement processes providing user interfaces in email applications in accordance with the present invention.

Email applications allow users to manage email messages with email commands. Email commands correspond to Create, Reply, Reply All, Forward, Send, Delete and other functions in managing email messages. For example a Reply command when activated by the user initiates creation of an email message replying to the sender of the selected email message. A Reply All command when selected or activated by the user initiates creation of an email message replying to the sender and all others included in the selected email message. Email commands are rendered or displayed on the user interface by the email application in order to enable the user to activate them with user inputs or gestures (for example on a touch screen display the Reply command is rendered as an icon and may be activated by the user touching or tapping the Reply icon). In the description of the present invention a portable client device that includes a touch screen display is often used as an exemplary device in embodiments for the sake of simplicity. Sometime a client device including a computer screen with user input from a computer mouse is used as an exemplary device in embodiments as well. However it should be understood and appreciated that the user interfaces and associated processes of the present invention may be applied to any other client device with one or more user interfaces.

Depending on the implementation there may be more than one way of providing email message selection and associated user interfaces. In one way an email message listed in an email folder such as the Inbox when selected by the user using a pre-defined input or gesture results in a display of the full email message separate from the Inbox with email commands to manage it. In another way an email message listed in an email folder such as the Inbox when selected by the user using a pre-defined input or gesture results in a display of the email message within the Inbox with at least a subset of email commands to manage it. When a user selection of an email message is detected on the user interface in an email application typically commands such as Reply command, Reply All command, Forward command and Delete command may be displayed on the user interface to enable the user to manage the selected email. In some user interfaces the Reply command and Reply All command are grouped together possibly including one or more other email commands as a group of commands under a group command and this group of commands is displayed when the group command is activated. Email communication is most useful when the same message is to be sent to multiple recipients. At the same time this useful feature also introduces a risk of unintended user actions which can lead to user remorse or regret. Specifically, these unintended user actions may arise when the Reply All command is activated by the user. This may happen unintentionally due to a risk of activating the Reply All command instead of the Reply command since they are typically collocated in email user interfaces. When the user interface is small such as in a portable client device there is a higher chance of the user unintentionally activating the Reply All command instead of the Reply command.

In another scenario when the user receives a message because the user was included in the blind carbon copy ("Bcc") address list by the sender of the message, the user may inadvertently activate the Reply All command under an erroneous assumption that the user was included in the "To" address list or carbon copy ("Cc") address list. In yet another scenario even though the user initially activates the Reply All command in the heat of the moment or haste the user may regret the selection of that command later.

Some email applications may allow the user to choose a default Reply mode setting as Reply or Reply All in the controls or settings for the email application. If the default Reply mode setting is Reply then when an email message is selected the Reply command is included in the commands displayed but not the Reply All command which is displayed on activation of another command such as a More command or a group command. On the other hand if the default Reply mode setting is Reply All then when an email message is selected the Reply All command is included in the commands displayed but not the Reply command which is displayed on activation of another command such as a More command or a group command. So when the default Reply mode setting is Reply All there is a higher risk of unintended user actions associated with the use of the Reply All command.

The probability of the unintended user actions discussed above increases when the user interface is constrained in size. For example in small screen displays of portable devices only a part of the email message may be visible in the screen area resulting in an increase in the occurrences of the unintended user actions discussed above.

In one embodiment a process may render the Reply All command on the user interface in a manner that makes it clearly distinguishable from the Reply command. The Reply All command may be rendered on the user interface with distinguishing graphics. For example distinguishing graphics may involve one or more of text, color, shape, shade, highlight and other available graphics currently known or developed later. This helps in alerting the user even before activation of the Reply All command. The Reply command may also be rendered on the user interface in a manner that makes it clearly distinguishable from the Reply All command. The Reply command may be rendered on the user interface with distinguishing graphics. Consequently the probability of the user unintentionally activating Reply All command instead of the Reply command is reduced. This embodiment especially applies to user interfaces where the Reply command and Reply All command are grouped together possibly including one or more other email commands as a group of commands under a group command and this group of commands is displayed when the group command is activated.

Figure 3:
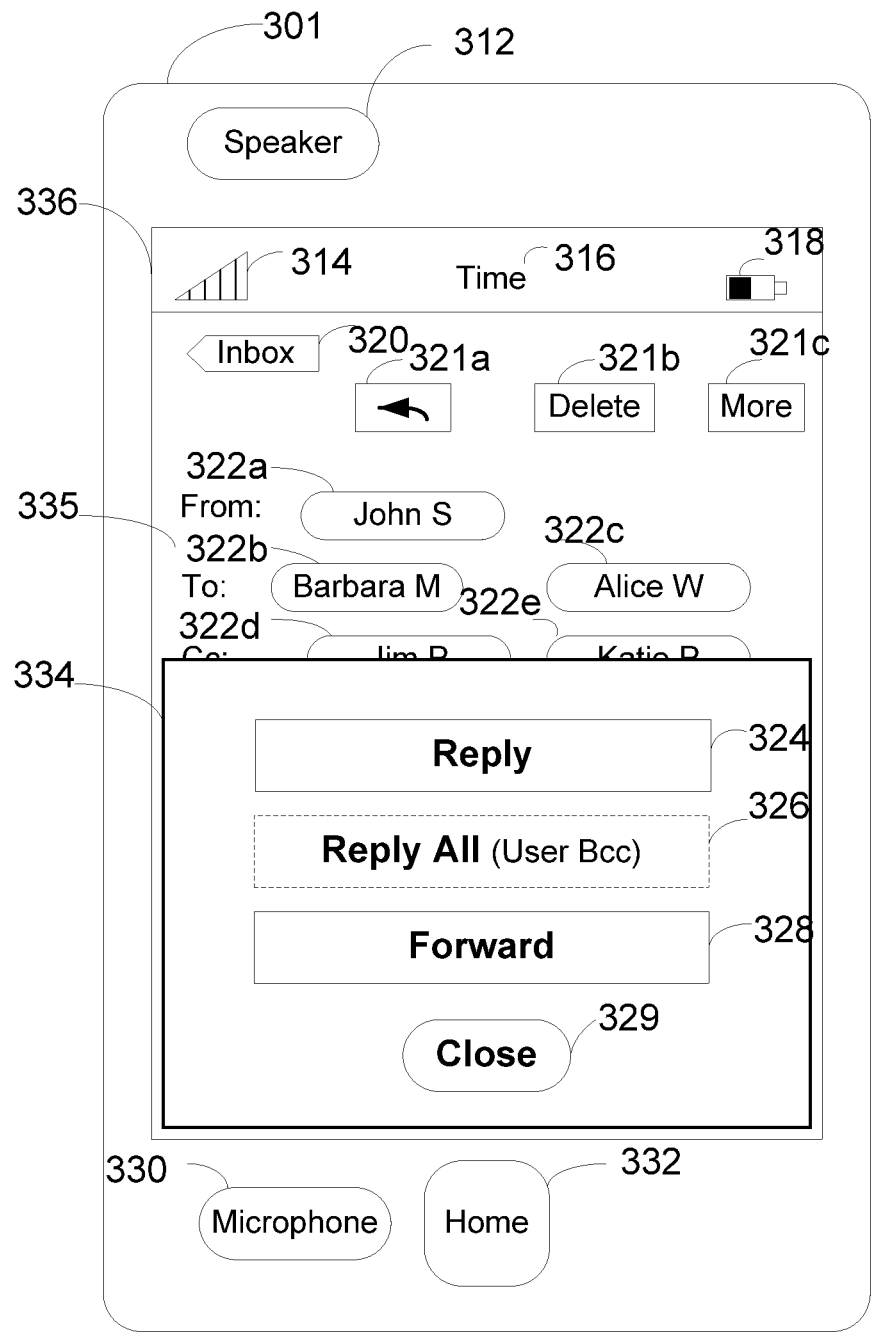
FIG. 3 illustrates an example user interface in an email application for a portable client device in accordance with some embodiments.

FIG. 3 is a diagram illustrating an example user interface in an email application for a portable client device 301. The portable client device 301 includes a touch screen 336. The touch screen 336 is touch sensitive and displays various objects or commands which may be selected or activated by the user (e.g. by a finger tap on the icon for a command). The device 301 may include a speaker 312, a microphone 330 and a "Home" button 332 which may be used to navigate to the "Home" screen of the device to access and manage various applications that may be executed on the device. A signal strength indicator 314 for wireless network connection, the current time 316 and a battery level indicator 318 are included on the touch screen 336. It will be understood that FIG. 3 is for illustration purpose only and well known technology components of a portable communication device are not described in detail so as not to obscure the description of the embodiments. A user interface for the user selected email message 335 after activation of the Reply/Reply All/Forward icon 321a is displayed on the touch screen 336. The inbox icon 320 when activated initiates the display of the inbox of the email application. The Reply/Reply All/Forward icon 321a when activated initiates the display of a pane 334 that includes the Reply icon 324, Reply All icon 326 and Forward icon 328 for the email message 335. The Close icon 329 when activated results in closing of the pane 334 and returning to the previous display of the user interface for the user selected email message 335 before the activation of the Reply/Reply All/Forward icon 321a. The Reply icon 324 when activated initiates creation of an email message replying to the sender of the email message 335. The Reply All icon 326 when activated initiates creation of an email message replying to the sender and all others included in the email message 335. The Forward icon 328 when activated initiates creation of an email message to forward the email message 335. The Delete icon 321b when activated initiates a user interface display that seeks confirmation to delete the email message 335. The More icon 321c when activated provides more commands or functions to manage the email message 335. The user selected email message 335 as displayed includes the name 322a of the sender, names 322b, 322c of the recipients in the To address list and names 322d, 322e of the recipients in the Cc address list. In accordance with the above embodiments the Reply icon 324 and Reply All icon 326 may be rendered on the pane 334 with distinguishing graphics to clearly distinguish one from the other (the Reply All icon 326 is shown using dashed lines to highlight this point). For example distinguishing graphics may involve one or more of text, color, shape, shade, highlight and other available graphics currently known or developed later. It will be appreciated that one or more elements of the user interface described in FIG. 3 are also applicable to the webmail scenario where the user interface for an email application executed on a webmail server may be accessed and displayed within a web browser on the touch screen 336.

Figure 4:
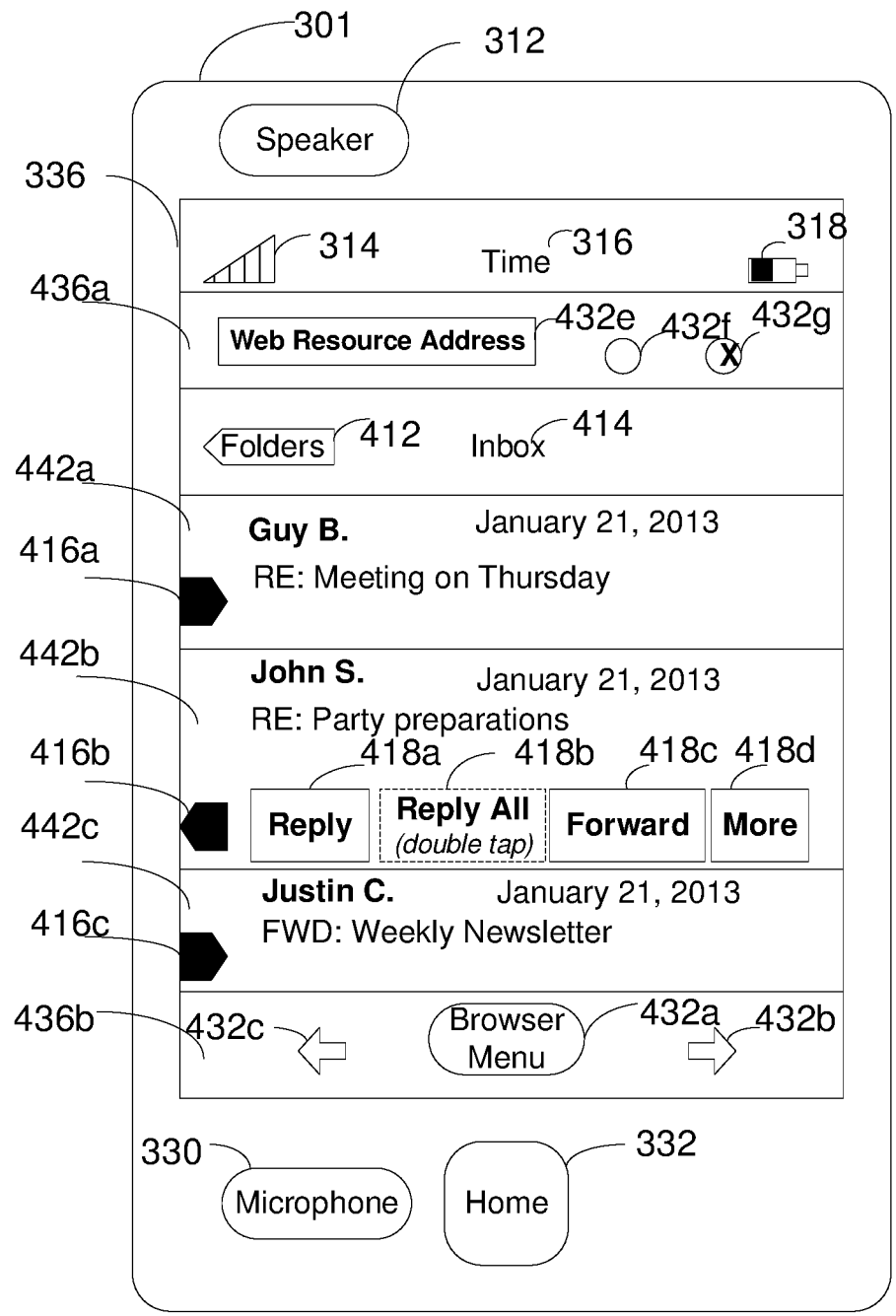
FIG. 4 illustrates an example user interface for a webmail application within a web browser on a portable client device in accordance with some embodiments.

FIG. 4 is a diagram illustrating an example user interface for a webmail application within a web browser on a portable client device 301. The touch screen 336, speaker 312, microphone 330, "Home" button 332, signal strength indicator 314, current time 316 and battery level indicator 318 are the same as described in FIG. 3. It will be understood that FIG. 4 is for illustration purpose only and well known technology components of a portable communication device are not described in detail so as not to obscure the description of the embodiments. A web browser enables users to access and view web information resources on the World Wide Web such as web pages, documents, images, video files, multimedia files and content provided by servers. A web information resource is referred to here as a web resource for convenience. A user interface for the Inbox 414 of a webmail application is displayed within a web browser with a top web browser panel 436a and a bottom web browser panel 436b. The top web browser panel 436a includes a web resource address bar 432e, a refresh icon 432f and a stop icon 432g. To access or load a web resource and view it in the web browser the corresponding web resource address is entered by the user in the web resource address bar 432e. The refresh icon 432f when activated reloads the web resource and the stop icon 432g when activated stops the loading of the web resource. The bottom web browser panel 436b includes a Browser menu icon 432a which when activated provides a user interface with a menu of commands to manage the web browser and web pages. The bottom web browser panel 436b also includes a Forward icon 432b and a Back icon 432c to go forward and back, respectively, in navigating web resources. The Folders icon 412 when activated initiates the display of the folders used to manage the email messages in the email application. In one embodiment a Command menu open icon is included with the display of an email message in the Inbox 414 which when activated results in the opening of the display of email commands for the email message and the display of a Command menu close icon. The Command menu open icon may have text, a letter, a symbol, a shape, a color or other graphics used in rendering it to provide additional guidance to the user that its activation would result in the opening of a display of an email command menu. The Command menu close icon may have text, a letter, a symbol, a shape, a color or other graphics used in rendering it to provide additional guidance to the user that its activation would result in closing the display of the email command menu. The Command menu open icon may be activated with a pre-defined input gesture such as a finger tap, finger touch, or a finger swipe in the direction suggested by the graphics of the Command menu open icon. The Command menu close icon may be activated with a pre-defined input gesture such as a finger tap, finger touch, or a finger swipe in the direction suggested by the graphics of the Command menu close icon. Activation of a Command menu open icon for an email message also deactivates the display of the Command menu currently active for any other email message (or equivalently activates the Command menu close icon currently active for any other email message) so that there is no more than one email message with its Command menu display active at any time in the Inbox 414. Email messages 442a, 442b, 442c are shown in the user interface for the Inbox 414 with the Command menu icon activated for email message 442b. The email message 442a is displayed with the sender name, the subject line, the date and a Command menu open icon 416a, which when activated opens the display of email commands for the email message. The email message 442c is displayed with the sender name, the subject line, the date and a Command menu open icon 416c which when activated opens the display of email commands for the email message. It will be understood that the Command menu open icons 416a, 416c are depicted as shown in FIG. 4 for illustration purpose only and may be implemented with any graphics known currently or developed later. The email message 442b is displayed with the sender name, the subject line, the date, the Command menu and the Command menu close icon 416b. It will be understood that the Command menu close icon 416b is depicted as shown in FIG. 4 for illustration purpose only and may be implemented with any graphics known currently or developed later. For email message 442b, the displayed Command menu includes the following email command icons: Reply icon 418a, Reply All icon 418b, Forward icon 418c and More icon 418d (depending on the implementation a subset or super set of these email commands may be displayed). The Command menu is displayed in FIG. 4 at the bottom of the display for the email message 442b for illustrative purposes. It will be understood that the Command menu (with email command icons such as Reply icon 418a, Reply All icon 418b, Forward icon 418c and More icon 418d) may be displayed anywhere on the display for the corresponding email message. For example the Command menu may be displayed over the display for the corresponding email message even if it partially covers the displayed email message. The Reply icon 418a when activated initiates creation of an email message replying to the sender of the email message 442b. The Reply All icon 418b when activated initiates creation of an email message replying to the sender and all others included in the email message 442b. The Forward icon 418c when activated initiates creation of an email message to forward the email message 442b. The More icon 418d when activated provides more commands or functions to manage the email message 442b. In accordance with the above embodiments the Reply icon 418a and Reply All icon 418b may be rendered with distinguishing graphics to clearly distinguish one from the other (the Reply All icon 418b is shown using dashed lines to highlight this point). It will be appreciated that one or more elements of the user interface described in FIG. 4 are also applicable to the email scenario where an email application (i.e. an email client application) is executed on a portable client device 301 with the touch screen 336.

In the description of the present invention any information derived from the Bcc address list, Cc address list and To address list of an email message is referred to as address-context information of the email message. In one example, address-context information of an email message may include information on whether the user was included in the Bcc address list, Cc address list or To address list of the email message. There may be cases where the user is included in more than one address list. There may also be cases where a user is included as an individual address and in a group address in the address lists of the email message. It will be appreciated that any such combinations of address-context information are all within the scope of this invention. In another example, the address-context information of an email message may include an abbreviated description of the Bcc address list, Cc address list and To address list of the email message. In yet another example, the address-context information of an email message may include the number of addresses in each of the address lists (i.e. Bcc address list, Cc address list and To address list) of the email message. The address-context information may be rendered using text, color, shade, shape or any other graphics currently known or developed later.

In one embodiment a process may provide, address-context information of an email message selected by the user, in the user interface for the Reply All command. The address-context information of the email message may be determined by the process any time prior to the rendering of the address-context information preferably sooner than later (e.g. as soon as the email message is received by the email application). The address-context information may be rendered using text, color, shade, shape or any other graphics currently known or developed later. In a variation of this embodiment address-context information of the selected email message may be provided, in the user interface for the Reply command and Forward command as well.

In one embodiment a process may provide, address-context information of an email message selected by the user, in the rendering of the Reply All command itself. The address-context information of the email message may be determined by the process any time prior to the rendering of the address-context information preferably sooner than later (e.g. as soon as the email message is received by the email application). The address-context information may be rendered using text, color, shade, shape or any other graphics currently known or developed later. In the case of text for example, if the user was included in the Bcc address list the corresponding text on the displayed Reply All command may include that address-context information in parenthesis as "Reply All (User Bcc)". The address-context information in text form may be rendered in graphics that is different from the Reply All command text. For example the address-context information in text form may be rendered in a different color, smaller font; lighter shade or lighter intensity than the Reply All command text.

In one embodiment a process may provide, address-context information of an email message selected by the user, for example in a pop-up information box, as a result of detecting the user "hovering over" a displayed Reply All command (for example a cursor moved over a Reply All icon with a computer mouse). The address-context information of the email message may be determined by the process any time prior to the rendering of the address-context information preferably sooner than later (e.g. as soon as the email message is received by the email application). The pop-up information box may be faded out or removed after a certain time interval, faded out or removed when the user is no longer "hovering over" the displayed Reply All command or closed by the user with an icon provided in the pop-up information box for that purpose. In a variation of this embodiment address-context information of the selected email message may be provided, for example in a pop-up information box, as a result of detecting the user "hovering over" either a displayed Reply command or a displayed Forward command as well.

In another embodiment a process may provide a prompt, for example in the form of a dialogue box, on the user interface when the Reply All command is activated. The prompt to the user may seek further input from the user on whether to proceed with the Reply All command or return to the previous user interface just before the Reply All command was activated. The prompt to the user may also include address-context information of the email message selected by the user. The address-context information of the email message may be determined by the process any time prior to the rendering of the address-context information preferably sooner than later (e.g. as soon as the email message is received by the email application). In a variation of this embodiment address-context information of the selected email message may be provided, using for example a prompt in the form of a dialogue box containing address-context information and seeking user input to proceed, when either a Reply command or Forward command is activated as well.

Figure 5:
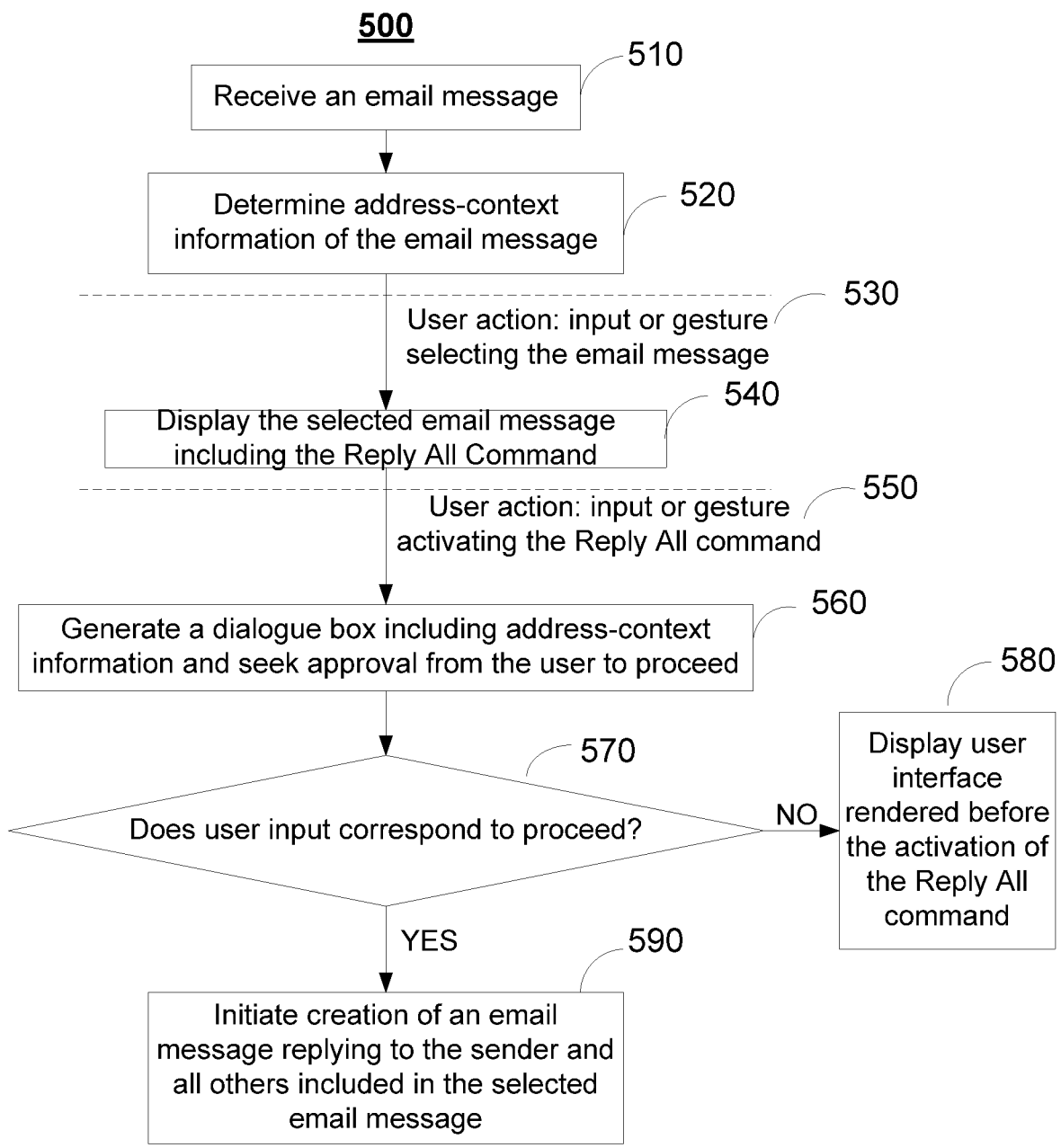
FIG. 5 is a flow chart of an example process for providing address-context information in the user interface for the Reply All command in accordance with some embodiments.

FIG. 5 is a flow chart of an example process 500 for providing address-context information in the user interface for the Reply All command in accordance with some embodiments. The process 500 starts with an email message being received by the email application (510). Address-context information of the email message is determined (520). In response to a user action (530) of selecting the email message, the selected email message is displayed including the Reply All Command (540). In response to a user action (550) that activates the Reply All command, a dialogue box including address-context information is generated which seeks approval from the user to proceed (560). If the received user input (570) corresponds to not proceeding with the Reply All command, the user interface rendered before the activation of the Reply All command is displayed (580). If the received user input (570) corresponds to proceeding with the Reply All command, creation of an email message replying to the sender and all others included in the selected email message is initiated (590). The process 500 is provided for illustration purposes. It will be appreciated that embodiments for providing address-context information in the user interface for the Reply All command may be implemented by similar processes using the principles described herein.

The Reply All icon 326 in FIG. 3 and the Reply All icon 418b in FIG. 4 may be implemented in accordance with the embodiments described above (the Reply All icon 326 and Reply All icon 418b are shown using dashed lines to highlight this point).

Note that in the case of some user interface inputs such as keyboard input and voice input the selection of each command naturally or intrinsically requires a different or even unique physical input or gesture from the user. However this is not the case in other user interface inputs such as visual interface inputs where the commands are rendered in different locations. For example in the case of user interface inputs such as a computer mouse input and a touch screen input the user typically uses the same basic physical input or gesture (click in the case of the computer mouse and touch or finger tap in case of touch screen) to select various commands at different locations on the screen. In one embodiment the user interface and associated processes may enable activation of the Reply All command with a predefined physical input or gesture from the user that is different from that used to activate the other email commands including the Reply command when the user interface input mechanism does not naturally or intrinsically require it. For example with a computer mouse interface a double click may be predefined for the activation of the Reply All command when a single click is used to activate the Reply command. In another example with a touch screen interface a double finger tap or pinch gesture may be predefined for the activation of the Reply All command when a single finger tap is used to activate the Reply command. This has the benefit of calling user attention to the action of activating the Reply All command especially when the Reply and Reply All commands are collocated and thereby reduces the probability of unintended user actions.

In one embodiment the Reply All command is rendered on the user interface with graphics that may provide the user with information on user input needed to activate it. This guides the user in using the right input/gesture that corresponds to the predefined input/gesture to activate the Reply All command. For example the graphics for the Reply All icon on a touch screen may involve an image to indicate a double finger tap input when a double finger tap user input is predefined to activate it. In one embodiment text information may be included in the displayed Reply All command that provides the user with information on the user input needed to activate it. For example the text on the Reply All icon on a touch screen may be "Reply All (double tap)" when a user input corresponding to a double finger tap is predefined to activate it. The text information on the predefined user input for activation may be rendered in graphics that is different from the Reply All command text. For example the text information on the predefined user input for activation may be rendered in a different color, smaller font; lighter shade or lighter intensity than the Reply All command text.

In one embodiment the information on the predefined user input for activation of the Reply All command may be displayed for example in a pop-up information box as a result of detecting the user "hovering over" the displayed Reply All command (for example a cursor moved over a Reply All icon with a computer mouse). In one embodiment the information on the predefined user input for activation of the Reply All command may be displayed for example in a pop-up information box as a result of detecting an incorrect user input or gesture in an attempt to activate the displayed Reply All command. For example on a touch screen interface a pop-up information box indicating double finger tap input may be generated when a single finger tap input is detected on a Reply All icon where a double finger tap is predefined to activate the Reply All icon. The pop-up information box may be faded out or removed after a certain time interval, faded out or removed when the user is no longer "hovering over" the displayed Reply All command or closed by the user with an icon provided in the pop-up information box for that purpose.

Figure 6:
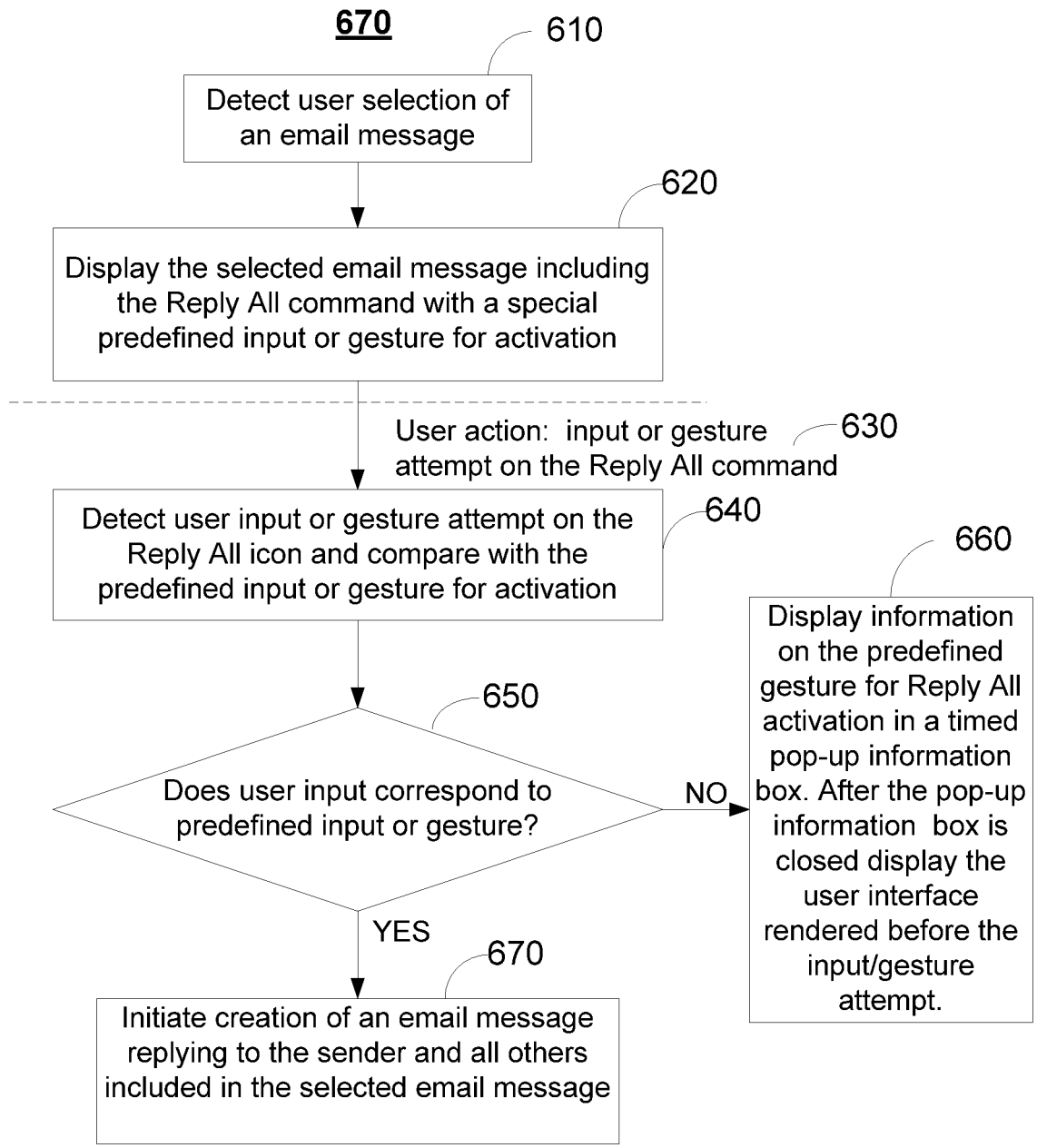
FIG. 6 is a flow chart of an example process for rendering the Reply All command with a special pre-assigned user input or gesture for activation in accordance with some embodiments.

FIG. 6 is a flow chart of an example process 600 for rendering the Reply All command with a special predefined user input or gesture for activation in accordance with some embodiments. A user selection of an email message is detected (610). The selected email message is displayed including the Reply All command with a special predefined input or gesture for activation (620). In response to a user action (630) that is an input or gesture attempt on the Reply All command, the user input or gesture attempt is compared with the predefined input or gesture for activation (640). If the user input or gesture does not correspond to the predefined input or gesture (650), information on the predefined gesture is provided in a timed pop-up information box and after the pop-up information box is closed the user interface rendered before the user input/gesture attempt on the Reply All command is displayed (660). If the user input or gesture corresponds to the predefined input or gesture (650), creation of an email message replying to the sender and all others included in the selected email message is initiated (670). The process 600 is provided for illustration purposes. It will be appreciated that embodiments for rendering the Reply All command with a special predefined user input or gesture for activation may be implemented by similar processes using the principles described herein.

In email applications when an email message is created in response to the activation of the Reply All command the input cursor is typically placed in the message area of the email message. In one embodiment a process on detecting the activation of the Reply All command initiates creation of an email message replying to the sender and all others included in the user selected email message and places the input cursor in any one of the address lists (i.e. To, Cc, Bcc) of the email message. This has the benefit of calling the attention of the user to the multiple recipients in the email message and reduces the risk of unintended user actions associated with the use of the Reply All command.

The Reply All icon 326 in FIG. 3 and the Reply All icon 418*b* in FIG. 4 may be implemented in accordance with the embodiments described above (the Reply All icon 326 and Reply All icon 418*b* are shown using dashed lines to highlight this point).

In one embodiment a process may display address-context information of an email message, for example in a pop-up information box, as a result of detecting the user "hovering over" a designated part or any part of the displayed email message (for example a cursor moved over an email message with a computer mouse). The address-context information of the email message may be determined by the process any time prior to the rendering of the address-context information preferably sooner than later (e.g. as soon as the email message is received by the email application). The address-context information may be rendered using text, color, shade, shape or any other graphics currently known or developed later. This address-context information aids the user in determining the appropriate action for managing the email message in general and specifically in the use of the Reply All command. This is especially useful when the email message is one of many listed in an email folder such as the Inbox where there is only a partial view of the email message presented to the user. The pop-up information box may be faded out or removed after a certain time interval, faded out or removed when the user is no longer "hovering over" the email message or closed by the user with an icon provided in the pop-up information box for that purpose.

In another embodiment a process may display address-context information of an email message, for example in a pop-up information box, as a result of the user selecting a displayed email message. The address-context information of the email message may be determined by the process any time prior to the rendering of the address-context information preferably sooner than later (e.g. as soon as the email message is received by the email application). The address-context information may be rendered using text, color, shade, shape or any other graphics currently known or developed later. The pop-up information box may be faded out or removed after a certain time interval or closed by the user with an icon provided in the pop-up information box for that purpose.

In another embodiment a process may display address-context information of an email message as a result of the user activating a Command menu icon (for example as depicted in FIG. 4) for the email message or any other icon designed to display address-context information. The address-context information of the email message may be determined by the process any time prior to the rendering of the address-context information preferably sooner than later (e.g. as soon as the email message is received by the email application). The address-context information may be rendered using text, color, shade, shape or any other graphics currently known or developed later. The address context information may be displayed for example in a pop-up information box. The pop-up information box may be faded out or removed after a certain time interval or closed by the user with an icon provided in the pop-up information box for that purpose.

Figure 7:
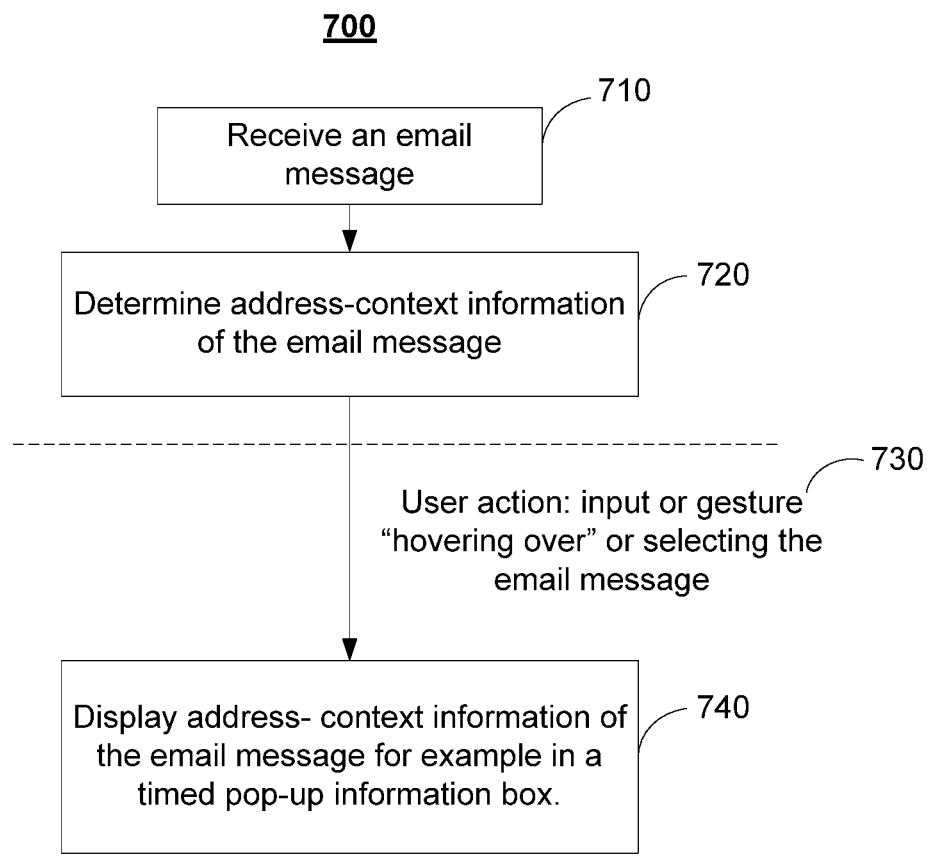
FIG. 7 is a flow chart of an example process for providing address-context information for an email message in accordance with some embodiments.

FIG. 7 is a flow chart of an example process 700 for displaying address-context information for an email message in accordance with some embodiments. The process 700 starts with an email message being received by the email application (710). Address-context information of the email message is determined (720). In response to a user action such as "hovering over" or selecting the email message (730), the address-context information of the email message is displayed for example in a timed pop-up information box (740). The process 700 is provided for illustration purposes. It will be appreciated that embodiments for displaying address-context information for an email message may be implemented by similar processes using the principles described herein.

In client devices with small screens an email message may exceed the screen area and may be displayed partially with the user having to move the email message up or down with user input or gestures to view various parts of it. Consequently while composing an email message only part of the email message may be visible to the user which may limit the context information available to the user at any given time. In some scenarios an earlier decision to activate the Reply All command resulting in the creation of an email message may not be valid for the user after the email message is composed due to the content (e.g. email body, file attachments) included in the email message. This increases the risk of unintended use of the Reply All command. So the user may benefit from being given an option to reconsider the earlier decision to activate or use the Reply All command before sending the email message. In general the user may benefit from being provided more information such as address-context information before sending an email message. Features that provide such benefits to the user may be included in the implementation of the user interface for the Send command of an email message. The Send command is displayed in such a way that it is readily accessible or visible to the user at any time during the composition or editing of an email message (e.g. a Send icon on a touch screen display at the bottom of the screen area or at the top of the screen area).

Figure 8:
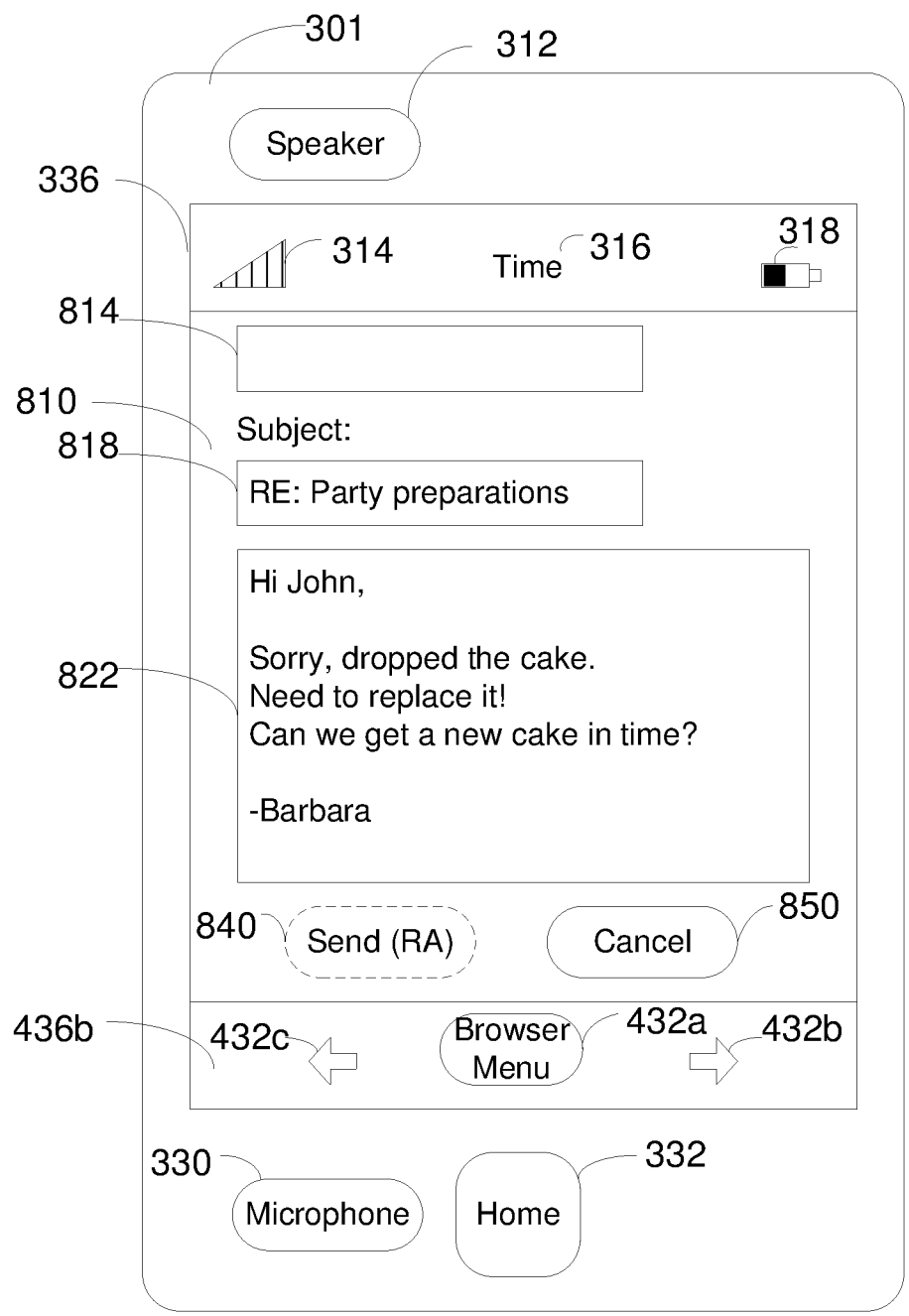
FIG. 8 illustrates an example user interface for an email message ready to be sent in a webmail application within a web browser on a portable client device in accordance with some embodiments.

FIG. 8 is a diagram illustrating an example user interface for an email message 810 ready to be sent in a webmail application within a web browser on a portable client device 301. The touch screen 336, speaker 312, microphone 330, "Home" button 332, signal strength indicator 314, current time 316 and battery level indicator 318 are the same as described in FIG. 3. The bottom web browser panel 436b, Browser menu icon 432a, Forward icon 432b and Back icon 432c of the web browser are the same as described in FIG. 4. The top web browser panel of the web browser is not displayed due to the small screen size and may be accessed by moving the display of the email message 810 down with a user input or gesture (e.g. downward finger swipe). It will be understood that FIG. 8 is for illustration purpose only and well known technology components of a portable communication device are not described in detail so as not to obscure the description of the embodiments. The creation of the email message 810 in FIG. 8 was initiated as a result of the user activation of a Reply All command. The email message 810 exceeds the screen area and therefore is displayed partially. The partial view of the email message 810 includes a Bcc Address input field 814, Subject field 818, Body field 822, Send icon 840 and Cancel icon 850. The top portion of the email message 810 containing the To, Cc, and Bcc address lists may be accessed by moving the display of the email message 810 down with a user input or gesture (e.g. downward finger swipe). The Send icon 840 when activated initiates a procedure to send the email message 810. The Cancel icon 850 when activated initiates a procedure to cancel sending the email message 810. It will be appreciated that one or more elements of the user interface described in FIG. 8 are also applicable to the email scenario where an email application (i.e. an email client application) is executed on a portable client device 301 with the touch screen 336.

In one embodiment a process may render the Send command for an email message on the user interface, by including in the rendering information or an indication as to the command (e.g. Reply, Reply All or Forward) that was activated to create the email message. This indication to the user may be included in the rendering of the Send command using graphics that may involve one or more of text, color, shape, shade, highlight and other available graphics currently known or developed later. For example a predefined color may be used in the rendering of the Send command for an email message to indicate that the Reply All command was activated to create the email message. Similarly predefined colors may be used in the rendering of the Send command for indications corresponding to preceding activations of Reply and Forward commands. In another example predefined text (e.g. "RA" for Reply All, "R" for Reply and "F" for Forward) corresponding to the indications may be included in parenthesis on the Send command icon. For instance, to indicate that the Reply All command was activated to create the email message to be sent, the text displayed on the Send command icon may be "Send (RA)". Similarly the text displayed on the Send command icon may be "Send (R)" or "Send (F)" for indications corresponding to the Reply or Forward command, respectively. In another embodiment when a new email message is created by activating the Create command the rendering of the corresponding Send command for the email message may include an indication that the Create command was used to create the email message. The indication may be implemented with any graphics including a predefined color or predefined text on the Send command icon (e.g. text displayed on the Send command icon may be "Send(C)").

Figure 9:
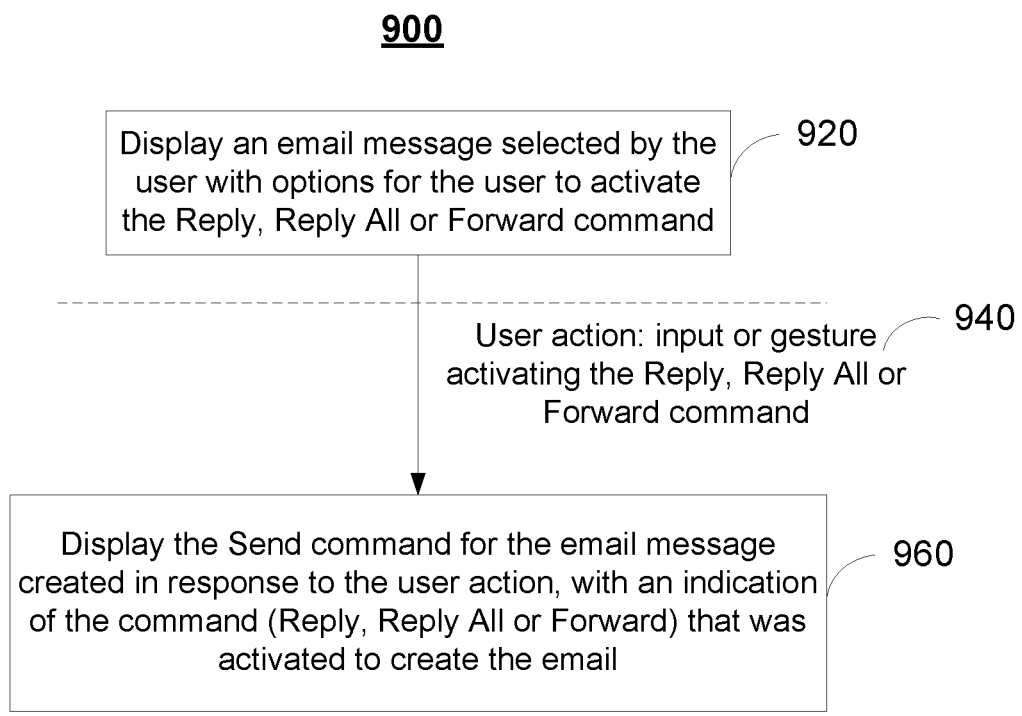
FIG. 9 is a flow chart of an example process for rendering the Send command in accordance with some embodiments.

FIG. 9 is a flow chart of an example process 900 for rendering the Send command in accordance with some embodiments. Process 900 begins with the display of an email message selected by the user, with options for the user to activate the Reply, Reply All or Forward command (920). In response to a user action of activating the Reply, Reply All or Forward command (940), the Send command for the email message created in response to the user action, is displayed with an indication of the command (i.e. Reply, Reply All or Forward) that was activated to create the email (960). The process 900 is provided for illustration purposes. It will be appreciated that embodiments for rendering the Send command for an email message may be implemented by similar processes using the principles described herein.

In one embodiment a process may provide pop-up information, as a result of detecting the user "hovering over" the Send command (for example a cursor moved over the Send icon with a computer mouse). The pop-up information may be for example in the form of a pop-up information box. The pop-up information may include information or an indication as to the command (e.g. Reply, Reply All or Forward) that was activated to create the email message to be sent.

In one embodiment a process may provide a prompt, for example in the form of a dialogue box, on the user interface when the Send command is activated. The prompt to the user may seek further input from the user on whether to proceed with the Send command or return to a previous user interface displayed before the Send command was activated. The prompt to the user may include information or an indication as to the command (e.g. Reply, Reply All or Forward) that was activated to create the email message to be sent. In another variation of this embodiment a process may provide a prompt, for example in the form of a dialogue box, on the user interface when the Send command is activated only in the case when a Reply All command was activated to create the email message to be sent. The prompt to the user may include information or an indication that the Reply All command was activated to create the email message to be sent.

Figure 10:
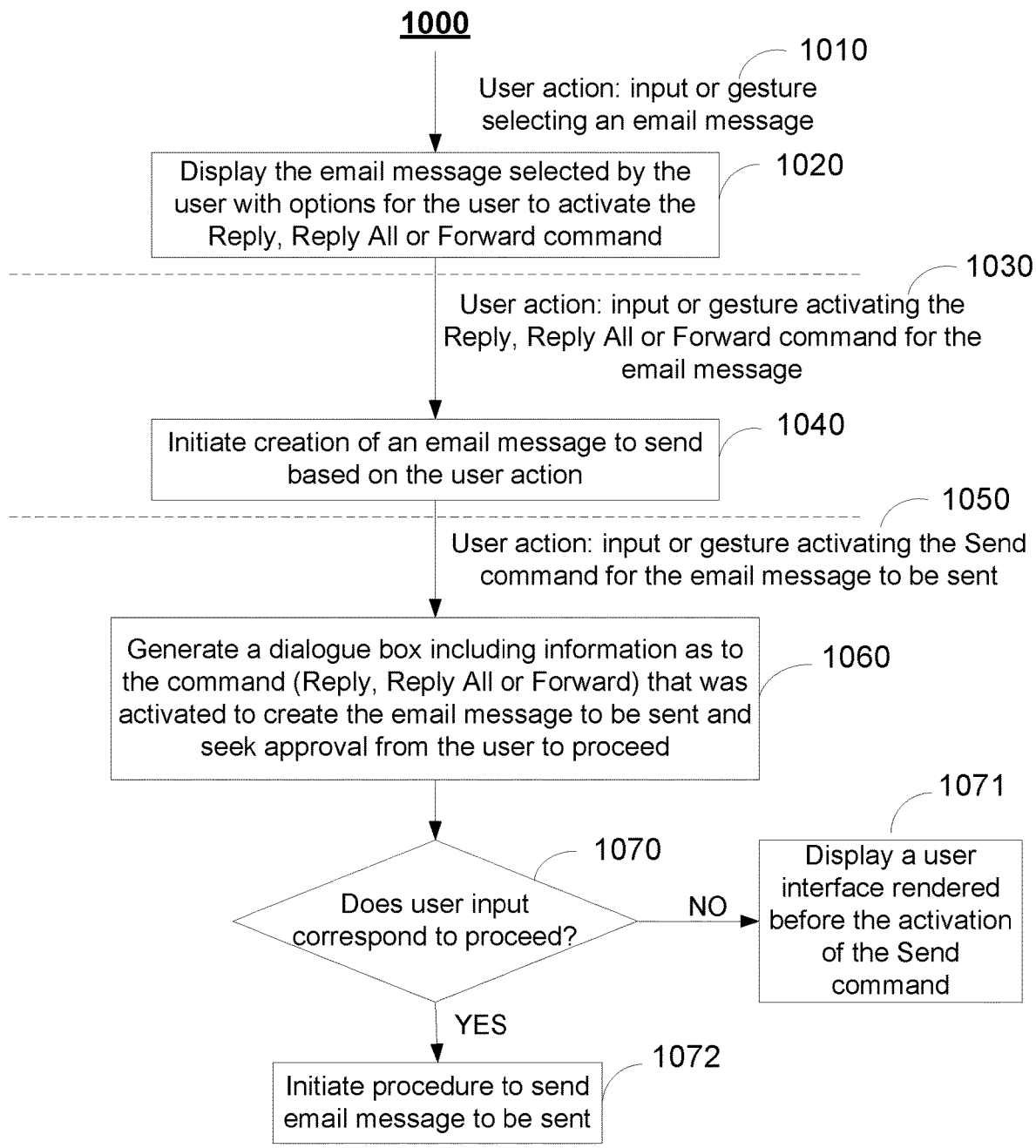
FIG. 10 is a flow chart of an example process for providing a prompt with information related to prior command activation to the user, in the user interface for the Send command in accordance with some embodiments.

FIG. 10 is a flow chart of an example process 1000 for providing a prompt with information related to prior command activation to the user, in the user interface for the Send command in accordance with some embodiments. The process 1000 starts with receiving a user input or gesture corresponding to a user action of selecting an email message (1010). In response to the user action (1010) of selecting the email message, the selected email message is displayed with options for the user to activate the Reply, Reply All or Forward command (1020). In response to a user action (1030) of activating the Reply, Reply All or Forward command for the email message, creation of an email message to send based on the user action is initiated (1040). In response to a user action (1050) that activates the Send command for the email message to be sent, a dialogue box including information as to the command (Reply, Reply All or Forward) that was activated to create the email message to be sent is generated which seeks approval from the user to proceed (1060). If the received user input (1070) corresponds to not proceeding with the Send command, a user interface rendered before the activation of the Send command is displayed (1071). If the received user input (1070) corresponds to proceeding with the Send command, a procedure is initiated to send the email message to be sent (1072). The process 1000 is provided for illustration purposes. It will be appreciated that embodiments for providing a prompt with information related to prior command activation to the user, in the user interface for the Send command, may be implemented by similar processes using the principles described herein.

In one embodiment the user interface and associated processes may enable activation of a Send command corresponding to a prior Reply All command activation with a predefined physical input or gesture from the user (e.g. a double finger tap or pinch gesture on a touch screen) that is different from that used to activate a Send command corresponding to a prior Reply command or Forward command activation (e.g. a single finger tap on a touch screen). This has the benefit of calling user attention to the action of activating the Send command corresponding to a prior Reply All command activation and thereby reduces the probability of unintended user actions. In a variation of this embodiment the user input to activate the Send command may be different for the different prior command (i.e. Reply, Reply All or Forward) activation cases.

In one embodiment the Send command is rendered on the user interface with graphics that may provide the user with information on user input needed to activate it. This guides the user in using the right input/gesture that corresponds to the predefined input/gesture to activate the Send command based on the prior command (i.e. Reply, Reply All or Forward) activation. For example the graphics for the Send icon on a touch screen may involve an image to indicate a double finger tap input when a double finger tap user input is predefined to activate it. In one embodiment text information may be included in the displayed Send command that provides the user with information on the user input needed to activate it. For example the text on the Send icon on a touch screen may be "Send (double tap)" when a user input corresponding to a double finger tap is predefined to activate it. The text information on the predefined user input for activation may be rendered in graphics that is different from the Send command text. For example the text information on the predefined user input for activation may be rendered in a different color, smaller font; lighter shade or lighter intensity than the Send command text.

In one embodiment the information on the predefined user input for activation of the Send command may be displayed for example in a pop-up information box as a result of detecting the user "hovering over" the displayed Send command (for example a cursor moved over a Send icon with a computer mouse). In one embodiment the information on the predefined user input for activation of the Send command may be displayed for example in a pop-up information box as a result of detecting an incorrect user input or gesture in an attempt to activate the displayed Send command. For example on a touch screen interface a pop-up information box indicating double finger tap input may be generated when a single finger tap input is detected on a Send icon where a double finger tap is predefined to activate the Send icon in that instance. The pop-up information box may be faded out or removed after a certain time interval, faded out or removed when the user is no longer "hovering over" the displayed Send command or closed by the user with an icon provided in the pop-up information box for that purpose.

In one embodiment a process may provide address-context information of an email message for which the Reply, Reply All or Forward command was activated, in the user interface for the Send command of the corresponding email message created to be sent. The address-context information of the email message may be determined by the process any time prior to the rendering of the address-context information preferably sooner than later (e.g. as soon as the email message is received by the email application). The address-context information may be rendered using text, color, shade, shape or any other graphics currently known or developed later.

In one embodiment a process may provide, address-context information of an email message for which the Reply, Reply All or Forward command was activated, in the rendering of the Send command of the corresponding email message created to be sent. The address-context information of the email message may be determined by the process any time prior to the rendering of the address-context information preferably sooner than later (e.g. as soon as the email message is received by the email application). The address-context information may be rendered using text, color, shade, shape or any other graphics currently known or developed later. In the case of text for example, if the user was included in the Bcc address list of an email message being replied to or forwarded, the text on the displayed Send command of the corresponding email to be sent may include this address-context information in parenthesis next to the Send command text as "Send (User Bcc)". The address-context information in text form may be rendered in graphics that is different from the Send command text. For example the address-context information in text form may be rendered in a different color, smaller font; lighter shade or lighter intensity than the Send command text.

In one embodiment a process may provide, address-context information of an email message for which the Reply, Reply All or Forward command was activated, for example in a pop-up information box, as a result of detecting the user "hovering over" the Send command (for example a cursor moved over the Send icon with a computer mouse) of the corresponding email message created to be sent. The address-context information of the email message may be determined by the process any time prior to the rendering of the address-context information preferably sooner than later (e.g. as soon as the email message is received by the email application). The pop-up information box may be faded out or removed after a certain time interval, faded out or removed when the user is no longer "hovering over" the displayed Send command or closed by the user with an icon provided in the pop-up information box for that purpose.

In another embodiment a process may provide a prompt, for example in the form of a dialogue box, on the user interface when the Send command is activated. The prompt to the user may seek further input from the user on whether to proceed with the Send command or return to a previous user interface displayed before the Send command was activated. In one variation of this embodiment the prompt to the user may include address-context information of the email message for which the Reply, Reply All or Forward command was activated resulting in the display of the Send command and the associated email message created to be sent. The address-context information of the email message may be determined by the process any time prior to the rendering of the address-context information preferably sooner than later (e.g. as soon as the email message is received by the email application).

Figure 11:
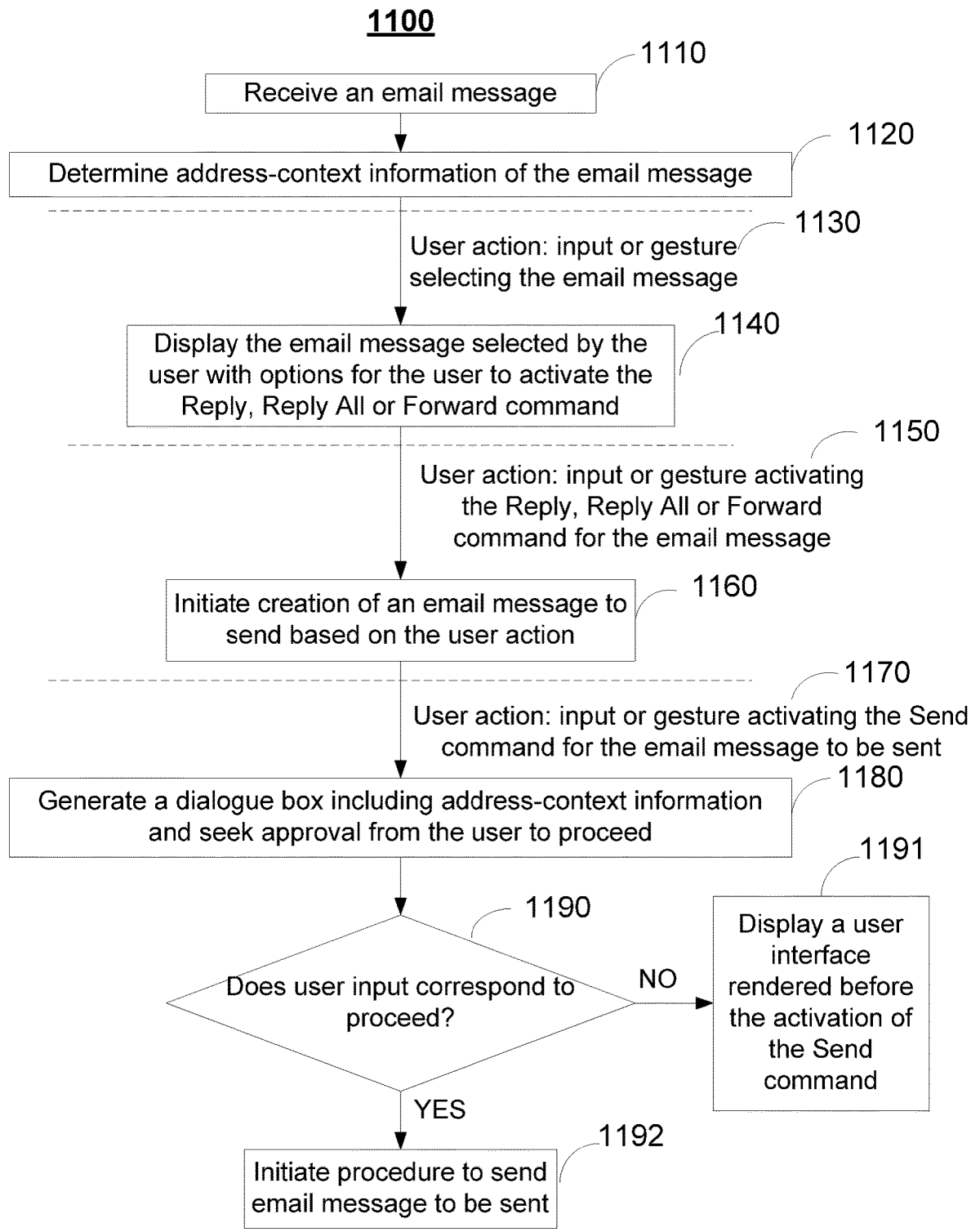
FIG. 11 is a flow chart of an example process for providing address-context information in the user interface for the Send command in accordance with some embodiments.

FIG. 11 is a flow chart of an example process 1100 for providing address-context information in the user interface for the Send command in accordance with some embodiments. The process 1100 starts with an email message being received by the email application (1110). Address-context information of the email message is determined (1120). In response to a user action (1130) of selecting the email message, the selected email message is displayed with options for the user to activate the Reply, Reply All or Forward command (1140). In response to a user action (1150) of activating the Reply, Reply All or Forward command for the email message, creation of an email message to send based on the user action is initiated (1160). In response to a user action (1170) that activates the Send command for the email message to be sent, a dialogue box including address-context information is generated which seeks approval from the user to proceed (1180). If the received user input (1190) corresponds to not proceeding with the Send command, a user interface rendered before the activation of the Send command is displayed (1191). If the received user input (1090) corresponds to proceeding with the Send command, a procedure is initiated to send the email message to be sent (1192). The process 1100 is provided for illustration purposes. It will be appreciated that embodiments for providing address-context information in the user interface for the Send command may be implemented by similar processes using the principles described herein.

In a variation of the above embodiments for providing address-context information in the user interface for the Send command, a process may provide, address-context information of an email message created to be sent, in the user interface for the Send command of that email message with other aspects of the embodiments being the same. The address-context information of the email message may be determined by the process any time prior to the rendering of the address-context information preferably sooner than later (e.g. when the email message is first created and at any time one or more of the To, Cc and Bcc address lists of the email message are modified or updated).

The Send command icon 840 in FIG. 8 may be implemented in accordance with the embodiments described above (the Send command icon 840 is shown using dashed lines to highlight this point).

Others skilled in the art will appreciate that the above embodiments of the Send command described for a webmail scenario may be utilized in a scenario where an email application is executed on the client device.

As discussed earlier if the default Reply mode setting in an email application is Reply All then when an email message is selected the Reply All command is included in the commands displayed but not the Reply command which is displayed on activation of another command such as a More command or a group command. It will be understood and appreciated that the embodiments disclosed above may be applied to this scenario of the default Reply mode setting being Reply All. It will also be understood and appreciated that the embodiments disclosed above may be applied to the scenario of the default Reply mode setting being Reply where the Reply All command is displayed on activation of another command such as a More command or a group command.

In one embodiment controls or settings for disabling ("turning off") one or more features or elements described above may be included in the user interface for user control settings of the email application to allow the user to disable ("turn off") one or more features or elements. User controls for enabling ("turning on") disabled features or elements may also be included in the user interface for user control settings of the email application. For example a setting or control may be provided in the user control settings (in the user interface) to disable or enable a special predefined input or gesture for the activation of the Reply All command. User control settings for disabling or enabling may be defined for each feature or element separately or in any combination with the other features and elements. Furthermore configuration parameters for one or more features or elements described above may be included in the user interface for user control settings of the email application. For example a setting or control may be provided in the user control settings to predefine a special input or gesture (from a list of user inputs or gestures supported or allowable by the user interface system) for the activation of the Reply All command. In one embodiment the user control settings for the email application may be included in a user interface provided by the email application. In an alternative embodiment the user control settings for the email application may be included in a user interface outside of the email application (for example in the user interface provided for the general user control settings for the client device as a whole by the operating system of the client device).

In one embodiment the method in the present invention may be implemented as one or more processes in the email application on the client device to produce the user interfaces in accordance with the present invention.

In one embodiment the method in the present invention may be implemented as one or more processes in email applications on the client device and a server to produce the user interfaces in accordance with the present invention.

In one embodiment the method in the present invention may be implemented as one or more processes in the email application on a webmail server to produce the user interfaces in accordance with the present invention.

In one embodiment the method in the present invention may be implemented as one or more value added processes (e.g. add-on software, plug-in software) on the client device to work with the email application in producing the user interfaces in accordance with the present invention. In another embodiment these value added processes may be remotely installed over the network on to the client device.

In one embodiment the method in the present invention may be implemented as one or more value added processes (e.g. add-on software, plug-in software) on the client device to work with the web browser in producing the user interfaces in email applications in accordance with the present invention. In this scenario the user accesses an email application executed by a webmail server via a web browser. In another embodiment these value added processes may be remotely installed over the network on to the client device.

It will be understood and appreciated that all the embodiments disclosed above even if described using a portable client device may be practiced in any client device including but not limited to a Smartphone, Computer Tablet, Personal computer and Television set.

Even if features and elements are described or depicted above in specific combinations, others skilled in the art will understand and appreciate that each feature or element may be used individually or in any combination with the other features and elements.

Although the present invention has been described using specific embodiments disclosed herein, others skilled in the art will appreciate that modifications may be made to the embodiments without departing from the scope of the invention.

What is claimed is:

1. A method for email communication, executed at least in part in a computer system, the method comprising:
   receiving an incoming email message identifying a sender and message recipients;
   rendering the incoming email message with at least one command icon that can be activated by a user to create an outgoing email message from the incoming email message;
   detecting first input selecting the at least one command icon to create the outgoing email message; and
   responsive to the first input;
      activating a command associated with the command icon to create the outgoing email message; and
      rendering the outgoing email message with a Send icon extending over a Send-icon area encompassing a graphic indication as to the command activated to create the outgoing email message.

2. The method of claim 1, wherein the command comprises at least one of a Reply command, a Reply-All command, and a Forward command.

3. The method of claim 2, wherein the Send icon informs the user of second input to the Send icon required to activate a send command, the second input specific to a subset of the Reply command, the Reply-All command, and the Forward command.

4. The method of claim 3, wherein the second input comprises a gesture.

5. The method of claim 4, wherein the gesture comprises a double tap.

6. The method of claim 1, further comprising, responsive to second input over the Send icon, providing pop-up information to the user.

7. The method of claim 6, wherein the pop-up information includes the indication as to the command activated to create the outgoing email message.

8. The method of claim 1, wherein incoming email message includes a Bcc address list identifying the user, and wherein the Send icon indicates the user was identified in the Bcc address list.

9. The method of claim 1, further comprising sending the rendered outgoing email message to a webmail application, the webmail application to display the Send icon.

10. The method of claim 1, further comprising displaying the rendered incoming email message within a web browser.

11. The method of claim 1, wherein the at least one command icon specifies a group command associated with the incoming email message.

12. The method of claim 11, wherein the group command specifies a Reply command and a Reply-All command.

13. The method of claim 1, wherein the at least one command icon specifies a more command associated with the incoming email message.

14. A method for email communication, executed at least in part in a computer system, the method comprising:
   receiving an incoming email message identifying a sender and having at least one list of message recipients;
   deriving address context information from the at least one list of message recipients;
   rendering the incoming email message with at least one command icon that can be activated by a user to create an outgoing email message from the incoming email message, the at least one command icon including at least one of a forward icon, a reply icon, and a reply-all icon;
   detecting first input selecting one of the at least one command icon to create the outgoing email message;
   responsive to the first input, rendering the outgoing email message, the outgoing email message including a Send icon extending over a Send-icon area encompassing a graphic that includes an indication as to the command icon used to create the outgoing email message;
   detecting second input over the Send-icon area; and
   responsive to the second input, providing pop-up information including at least a subset of the address context information.

15. The method of claim 14, wherein the at least one list of recipients includes a Bcc address list identifying the user, and wherein the Send icon indicates the user is identified in the Bcc address list.

16. The method of claim 14, wherein the address context information includes an abbreviated description of the message recipients.

17. The method of claim 16, wherein the abbreviated description of the message recipients includes a number proportional to the number of the message recipients.

18. The method of claim 14, wherein the selected one of the at least one command icon is the reply-all icon and the pop-up information indicates selection of a reply-all command.

* * * * *